US006845905B2

United States Patent
Blad et al.

(10) Patent No.: US 6,845,905 B2
(45) Date of Patent: Jan. 25, 2005

(54) CURRENCY CONTAINER TRACKING SYSTEM AND A CURRENCY CONTAINER FOR USE THEREWITH

(75) Inventors: Steven J. Blad, Henderson, NV (US); Kenneth R. Dickinson, Las Vegas, NV (US)

(73) Assignee: VendingData Corporation, Las Vegas, NV (US)

(*) Notice: Subject to any disclaimer, the term of this patent is extended or adjusted under 35 U.S.C. 154(b) by 179 days.

(21) Appl. No.: 09/956,787

(22) Filed: Sep. 21, 2001

(65) Prior Publication Data

US 2002/0063035 A1 May 30, 2002

Related U.S. Application Data

(63) Continuation-in-part of application No. 09/395,396, filed on Sep. 13, 1999, now Pat. No. 6,328,149, which is a continuation-in-part of application No. 09/259,207, filed on Mar. 1, 1999, now Pat. No. 6,336,544, which is a continuation-in-part of application No. 08/675,899, filed on Jul. 5, 1996, now abandoned.

(51) Int. Cl.[7] .............................................. G06F 17/00
(52) U.S. Cl. ...................... 235/375; 235/379; 235/492; 902/9; 705/43
(58) Field of Search ............................. 235/375, 379, 235/492; 902/9; 705/43

(56) References Cited

U.S. PATENT DOCUMENTS

| | | | | |
|---|---|---|---|---|
| 5,234,209 A | | 8/1993 | Weigel et al. .............. 271/145 |
| 5,593,149 A | * | 1/1997 | Kimura et al. ............. 271/3.01 |
| 5,606,157 A | * | 2/1997 | Awatsu et al. .............. 235/379 |
| 5,774,876 A | * | 6/1998 | Woolley et al. ................ 705/28 |
| 5,781,442 A | * | 7/1998 | Engleson et al. ........... 700/214 |
| 5,804,804 A | * | 9/1998 | Fukatsu et al. ............. 235/379 |
| 5,869,819 A | * | 2/1999 | Knowles et al. ............ 235/375 |
| 5,920,287 A | * | 7/1999 | Belcher et al. ............. 342/450 |
| 6,014,649 A | * | 1/2000 | Kobayashi et al. ........... 705/43 |
| 6,032,127 A | * | 2/2000 | Schkolnick et al. .......... 705/23 |
| 6,125,307 A | | 9/2000 | Heidel et al. ............... 700/232 |
| 6,128,550 A | | 10/2000 | Heidel et al. ............... 700/232 |
| 6,264,556 B1 | * | 7/2001 | Izawa et al. .................. 463/25 |

* cited by examiner

Primary Examiner—Michael G. Lee
Assistant Examiner—Seung H Lee
(74) Attorney, Agent, or Firm—Rob L. Phillips; Quirk & Tratos

(57) ABSTRACT

The present invention features a tracking system for currency containers in a gaming casino. Currency is received in removable containers having a memory chip for storing information such as the container ID, the ID of the gaming machine, the date and time the container was placed in a gaming machine. A mobile cart or a hand-carried unit is provided to store and transport the containers to a counting room. Data in each container's memory is verified and continuously monitored by the cart. A docking station verifies, reads, and transmits data to a remote computer and also provides a printout. All temporary data is erased from memory, and the containers are ready for reuse. Each time a container is inserted into a machine or other apparatus, a date and time is written to memory so that a complete adit trail is available.

33 Claims, 11 Drawing Sheets

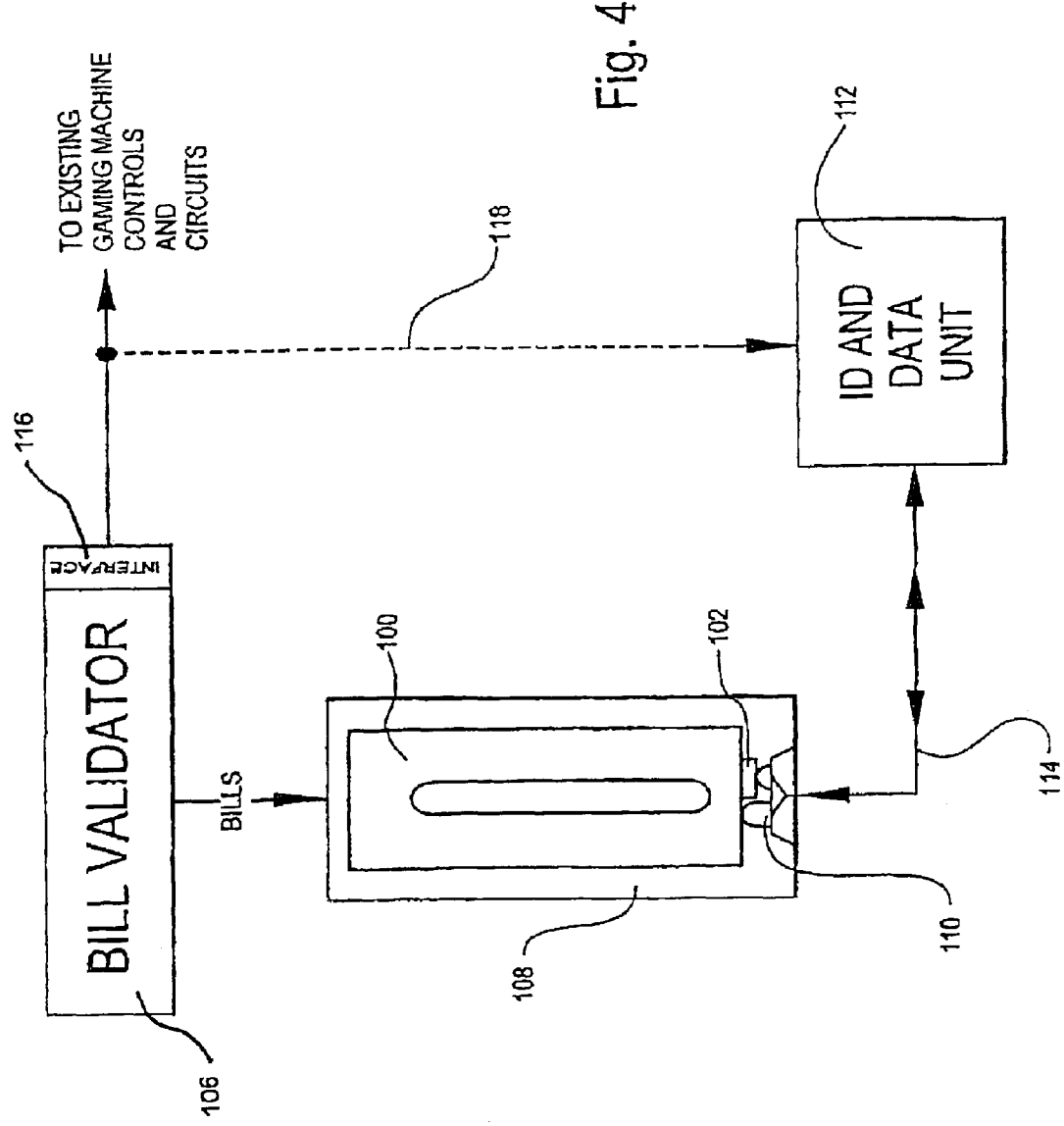

CURRENCY CONTAINER TRACKING SYSTEM AND A CURRENCY CONTAINER FOR USE THEREWITH

RELATED APPLICATIONS

This application is a continuation-in-part of application Ser. No. 09/395,396 filed Sep. 13, 1999, now U.S. Pat. No. 6,328,149, which is a continuation-in-part of application Ser. No. 09/259,207 filed Mar. 1, 1999 now U.S. Pat. No. 6,336,544, which is a continuation-in-part of application Ser. No. 08/675,899, filed Jul. 5, 1996, now abandoned.

BACKGROUND OF THE INVENTION

1. Field of the Invention

The present invention relates to a currency receiving container. More particularly, the invention comprises a currency receiving container for use in conjunction with a currency accepting machine such as a gaming, vending or similar machine. The container may be removed from the currency accepting machine and interchangeably, selectively inserted into one of several other devices forming a tracking system. The currency container has a non-volatile memory device for retaining both temporary and permanent electronic records (i.e., data). The memory associated with the currency container is connected to a host machine through contact surfaces on an exterior surface of the currency container. In addition to the currency container, a mobile unit for moving multiple currency containers, a portable, hand-held receiving unit, a temporary storage facility and a docking station are provided. An audit trail of each container is maintained in the non-volatile memory throughout a valid life cycle of the container. At the conclusion of the valid life cycle, temporary portions of the data in the non-volatile memory are erased.

2. Description of the Prior Art

Certain activities, such as vending and gaming, are available to the public in commercial premises dedicated to these activities. These premises contain gaming machines which operate automatically when a patron inserts currency into the machine. Gaming machines tend to amass currency rapidly and must periodically be emptied.

In particular, gaming machines are available in large numbers in casinos. Large numbers of people enjoy using these machines, which may all be in use despite the number of machines available. To enable rapid reestablishment of operability after retrieval of currencies, gaming machines are generally provided with interchangeable, removable currency collection containers, or stackers or bill drops as they are sometimes called. Service personnel employed by the casino arrive at a gaming machine with an empty currency collection container, remove the full container, and insert the empty container. The full container is then taken to a counting facility for accounting and verification of its contents.

Many containers are often present simultaneously at the counting facility, and various strategies have heretofore been used to track which currency collection container is associated with which gaming machine. These strategies include using serial numbers affixed to the currency collection containers, either temporarily using paper or other removable tags, or permanently by printing serial numbers directly on the currency collection containers. In either case, these methods are prone to human error and mistake.

The casinos may easily fail to recover all the currencies theoretically present in a currency collection container. Such losses are typically due to one of two reasons. A currency collection container may have been improperly inserted into a gaming machine (i.e., misaligned) so that some collected currency has failed to enter the container. In this case, the currency may have remained within the interior of the gaming machine or may have been retrieved and pocketed by dishonest personnel servicing the machine. Other times dishonest personnel may have removed currency from within a currency collection container, even when the currencies had properly entered the container.

Although most casinos have automated systems utilizing one or more computers for calculating the total sum which theoretically has been amassed by the machines, these systems fall short of being able to pinpoint specific causes of loss. This is because large numbers of currency containers are received at the counting facilities, and it is difficult to identify which container is short of its calculated receipts. In other words, while it is possible to calculate that the overall sum of the collected currency falls short of the theoretical total, it is difficult or impossible to identify poorly installed currency collection containers or dishonest employees.

U.S. Pat. No. 5,234,209 for DISPENSING UNIT FOR PAPER CURRENCY, issued Aug. 10, 1993 to Peter Weigel, et al. teaches a currency cassette for dispensing currency from an Automated Teller Machine (ATM) or the like. The WEIGEL, et al. cassette contains a memory device, but other than a cassette identification, no indication is made concerning any additional intended use or other types of information which could be stored in the memory device.

The currency container of the invention is adapted to receive, not dispense, currency or other paper documents. The memory device in the inventive currency container, in cooperation with several other sub-systems of the inventive tracking system, is designed to store an audit trail of date, time, and machine identification information clearly showing where the container has been and during what period of time it was inserted into each device. The memory device is capable of storing several other types of electronic information as well.

U.S. Pat. No. 6,128,550 for GAMING MACHINE PAYOUT DISPENSING SYSTEM AND METHOD, issued Oct. 3, 2000 to Raymond J. Heidel, et al. teaches a cassette for containing paper tokens for payout from a gaming machine. While the HEIDEL, et al. cassette is adapted for payout rather than receiving paper documents (i.e., currency, scrip, vouchers, paper tokens, coupons, etc.), there are some functions incorporated into their cassette that are analogous to the currency container of the present invention. The HEIDEL, et al. cassette includes a memory device adapted to connect through contacts on the cassette, to the gaming machine. The HEIDEL, et al. memory device is adapted to store a unique cassette ID as well as several other types of temporary information. The HEIDEL, et al. cassette is initialized at a docking station where such information as the paper token count, the paper token denomination and the date and time the cassette was loaded is written into its memory device.

In contradistinction, the currency container tracking system of the present utilizes a currency container adapted to receive currency or other paper documents (e.g., bills, coupons, paper tokens, etc.), not a cassette preloaded with paper documents to be dispensed. The instant invention also features a system for tracking currency containers from their initialization (i.e., clearing of all temporary data contained in their memory chips) until they are finally emptied, typically in a secure counting room, and their contents enumerated and/or verified. Each currency container receives a time stamp upon its initial insertion into a gaming machine, thus beginning a valid life cycle. Thereafter, each currency container is periodically time stamped while in a gaming machine so that once removed, the most recent date/time information corresponds closely to the actual removal date and time. The currency containers of the invention are typically transferred to a collection cart where the data contents of each container's memory device is verified. Continuous communication is maintained with the currency containers for the duration of their stay on the collection cart. Alternately, unscheduled pickups may be required from a gaming machine, and a portable unit for carrying one or more currency containers and having all the monitoring capabilities of the collection cart is provided. Also, a temporary storage rack is available to receive and monitor currency containers and hold them until the regular counting time when the secure vault will be available. Finally, a docking station is used to print a bar coded batch slip containing a complete audit trail showing dates and times a currency container was inserted in any of the various subsystem devices of the inventive system. Finally, temporary data from the currency containers is cleared thereby ending their valid life cycle.

Neither of the above inventions and patents, taken either singly or in combination, is, however, seen to anticipate or suggest the instant invention as claimed.

SUMMARY OF THE INVENTION

The present invention relates to a system for tracking individual currency containers through a facility having vending or gaming machines, each having currency acceptor units designed to receive currency from patrons of the machines. Accepted currencies are stored in removable currency containers within individual gaming machines, each container having a non-volatile memory chip attached for storing such information as a unique container ID, the ID of the gaming machine into which the currency container has been inserted, the date and time the current "valid life cycle" began, an audit trail of where the container has been, and other such information. A mobile cart is provided for securely storing and transporting multiple currency containers removed from individual gaming machines to a secure counting facility. The non-volatile memory device on each currency container is communicatively connected to the mobile cart so that the information in the memory may be read and verified. In addition, the status of each currency container is continuously monitored by the mobile cart. Also provided is a docking station where the memory contents may be read and a printout made. In addition, a secure storage apparatus, similar to the mobile cart but designed for stationary storage and continuous monitoring of currency containers is provided. Each time a currency container visits a station adapted to read and/or write to the non-volatile memory chip, the container's history may be read and a determination made as to whether the container should currently be at the particular station. An alarm may be sounded to signal that human intervention is required for the container when required. At the end of a useful life cycle, all temporary data is erased from each memory device, and the erased (except for the permanent currency container ID) currency containers are ready for reuse in a gaming machine. The inventive system provides a complete audit trail, tracking a currency container through its useful life cycle from installation in a gaming machine to its emptying and the erasure of its temporary data. The data and time is recorded each time the currency container is installed in and removed from each machine, monitoring unit and transporting unit and/or temporary storage facility.

Accordingly, it is a principal object of the invention to provide a currency container having a non-volatile memory device.

It is another object of the invention to provide a currency container having a non-volatile memory device containing a permanent currency container ID.

It is a further object of the invention to provide a series of devices adapted to receive a currency container and read from and/or write to the container's non-volatile memory device.

Still another object of the invention is to provide an electronics package for installation in a gaming, vending, or similar currency accepting machine to allow reading from and writing to the non-volatile memory device when the currency container of the present invention is installed in the gaming machine.

An additional object of the invention is to provide an electronics package for installation in a gaming, vending, or similar currency accepting machine which can perform checking of the data stored in the non-volatile memory device when the currency container is installed in the gaming machine.

It is again an object of the invention to provide a mobile cart for receiving and electronically monitoring a large number of currency containers removed from gaming machines and for transporting the currency containers to a secure counting facility.

It is another object of the invention to optionally provide a hand held carrier for receiving and electronically monitoring a small number of currency containers removed from gaming machines and facilitating their transport to a counting facility.

It is an additional object of the invention to optionally provide a temporary storage facility for currency containers for monitoring containers between predefined counting times when a casino's vault is typically open.

It is yet another object of the invention to provide a docking station for initializing currency containers by erasing all temporary data stored in their memory devices.

It is again an object of the invention to provide a docking station for having a computer interface for transmitting the contents of a currency container's memory device to an external computer.

It is a further object of the invention to provide a docking station for having an integrated printer for printing at least some of the data from a currency container's memory device.

It is another object of the invention to provide a docking station having a data correction facility allowing recovery from at least simple data errors.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same become better understood when considered in conjunction with the accompanying drawings, in which like reference characters designate the same or similar parts throughout the several views, and wherein:

FIG. 4 is a simplified block diagram showing the electrical interconnection of the currency container of FIG. 1 to an ID/Data Unit;

FIG. 7b is an enlarged view of a portion of the mobile unit of FIG. 7a;

FIG. 12a is a perspective view of a docking station; and

FIG. 12b a side, cross-sectional view of the docking station of FIG. 12a.

DETAILED DESCRIPTION OF THE PREFERRED EMBODIMENTS

The present invention relates to a system for tracking currency containers in an environment such as a gaming casino. Each currency container has an attached non-volatile memory device which stores a mix of both permanent and non-permanent data. Six components are provided for cooperative use in the inventive tracking system: a currency container, an ID/Data Unit for installation in a gaming machine, a mobile unit for collecting and monitoring currency containers, a portable collection unit, a temporary storage unit and a docking station. Each of these components are described in detail hereinbelow.

Figure 1:
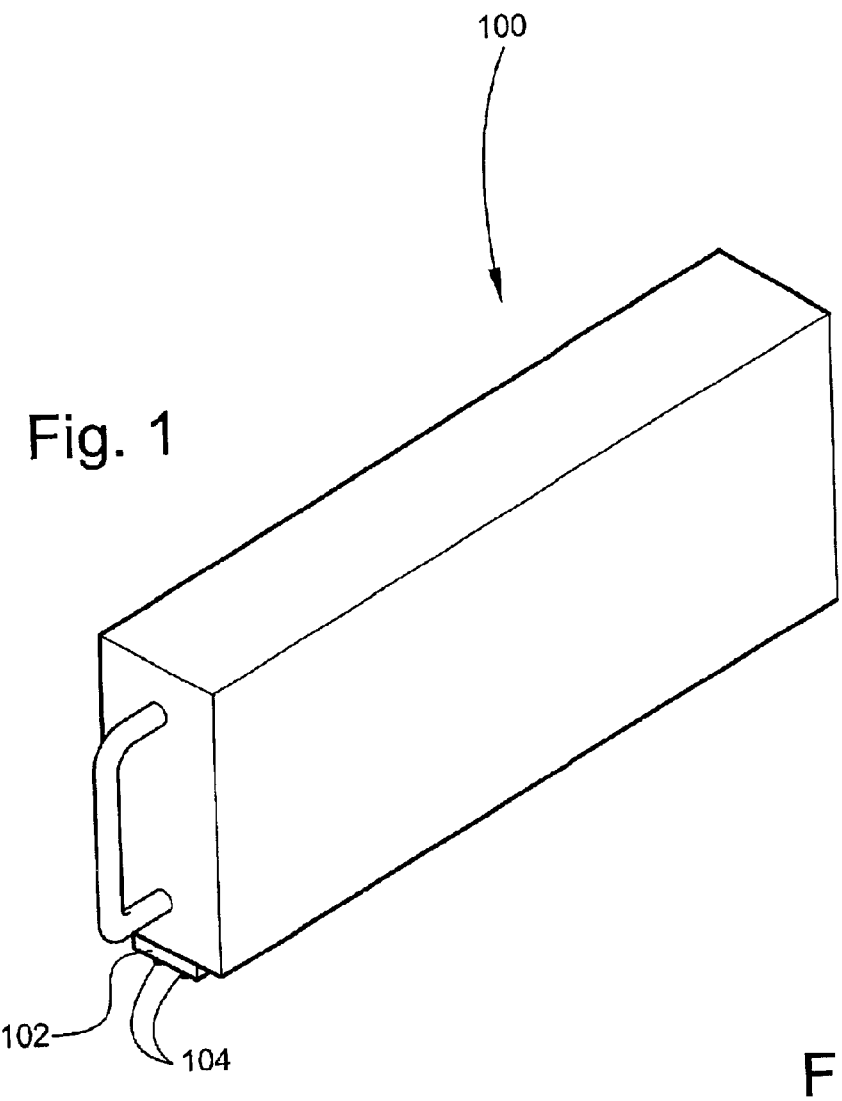
FIG. 1 is a schematic perspective view of the currency container for use with the tracking system of the invention.

Referring first to FIG. 1, there is shown a perspective view of a typical removable currency container 100 suitable for use within and in cooperation with a currency acceptor (e.g., a bill validator) in a vending, gaming, or similar machine. Such currency containers are well known in the art and are widely used in gaming, vending, and similar machines. A memory device 102 is shown attached to the exterior of the bottom surface of container 100. A pair of electrical contacts 104, corresponding to data and ground reference, are disposed on the bottom surface of memory device 102. In the embodiment chosen for purposes of disclosure a Dallas Semiconductor iButton™ type DS1994 NVRAM device has been used. This iButton™ device provides 4 KBits of non-volatile memory as well as built-in real time clock, interval timer and cycle counter functions. It is housed in a stainless steel enclosure and requires only a single data line and ground reference to function. Energy to operate the device is either scavenged from the data line to which the device is attached, or may be provided by a built-in lithium cell. A device such as the iButton™ is ideal for this application. Not only is it physically rugged, but only two electrical contacts must be provided to read and/or write data to and from its memory. It has a large enough memory capacity so that a detailed audit trail may easily be stored and, because it is self-powered, the memory contents are preserved even when the chip is removed from a power source (i.e., a signal line) for extended periods of time. It will be recognized by those skilled in the art that other non-volatile memory devices such as flash memory and EPROMs to be used in this application.

In the preferred embodiment, memory chip 102 is placed on the bottom of container 100. This is convenient because the weight of container 100 helps maintain contact with a mating contact pad as will be described in detail hereinbelow. It should be obvious that memory device 102 could be placed anywhere on the outside surface of currency container 100 as long as suitable mating contacts are provided. In alternate embodiments, memory device 102 could be placed within currency container 100 if a suitable external contact system and interconnecting wiring to memory device 102 were provided. While two electrical contacts are provided, the use of alternate memory devices may necessitate other electrical contact configurations. It will also be recognized by those of skill in the data communications art, that contactless interconnections systems could also be used in this application. Typical contactless system included those using radiant energy (e.g., infrared), or an inductive or radio frequency communication link.

Figure 2:
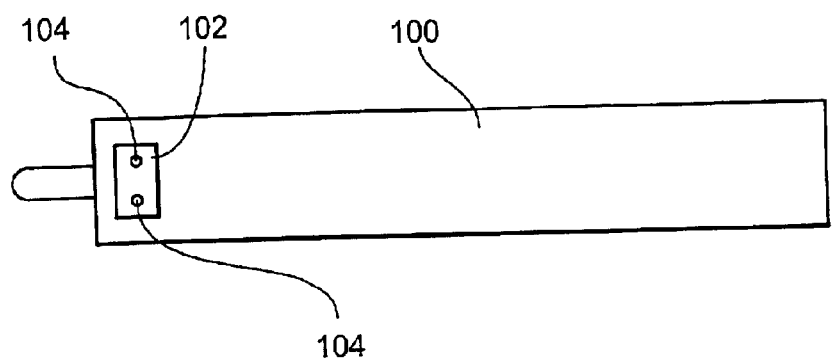
FIG. 2 is a bottom, plan view of the currency container of FIG. 1.

FIG. 2 shows a bottom view of currency container 100 with memory device 102 and contacts 104. It should also be obvious that memory device 102 could be located at other positions on the bottom surface of currency container 100.

Figure 3A:
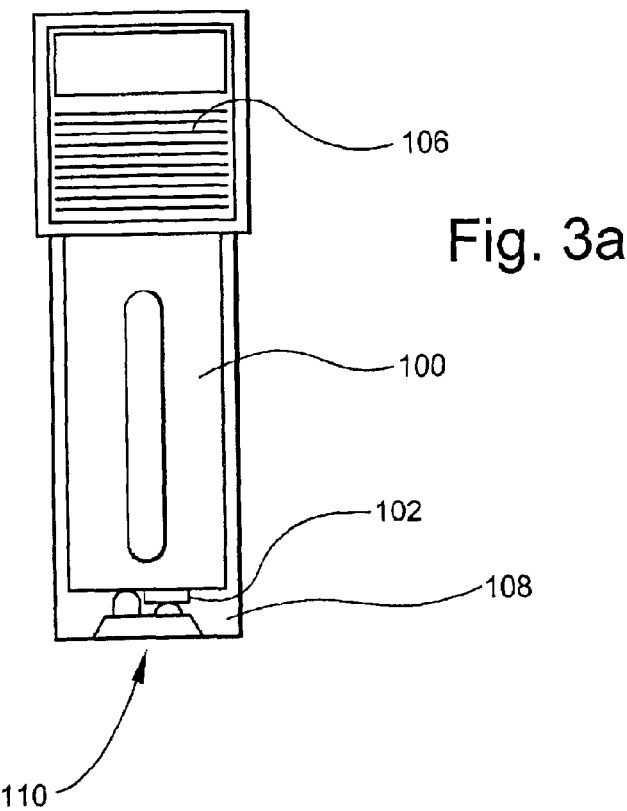
FIGS. 3a and 3b are front elevational and side cross-sectional views, respectively, of the currency container of FIG. 1 installed proximate a bill acceptor in a portion of a gaming machine.
Figure 3B:
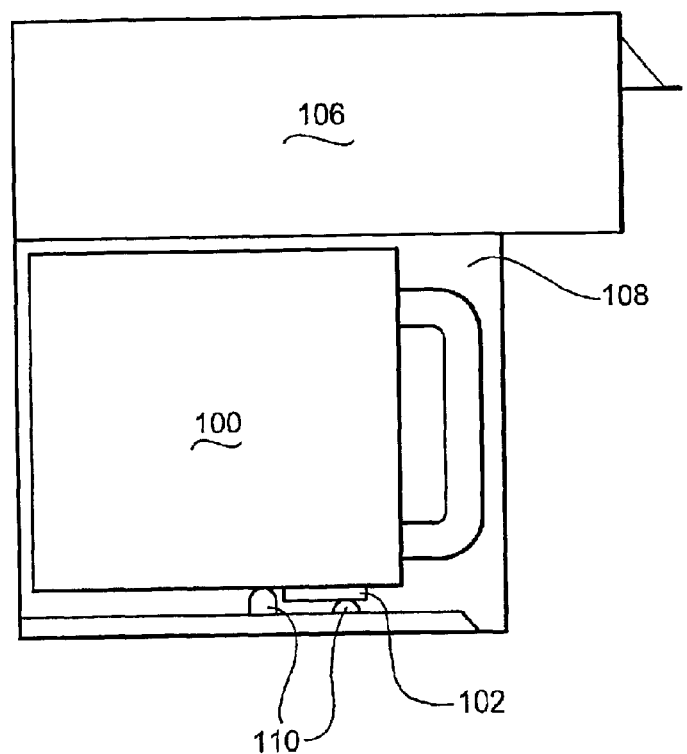

Referring now to FIGS. 3a and 3b, there are shown front elevational and side sectional schematic views, respectively, of currency container 100 in an operating position within a portion of a currency accepting machine. Currency accepting machines include gaming, vending, and similar types of machines. The term gaming machine will be used hereinafter to include gaming as well as vending and other similar machines capable of accepting currency and providing a product or service in return therefor. Currency acceptor 106, often also called a bill validator, is positioned adjacent to, typically above, currency container 100 in a bill validator compartment 108. Contacts 104 of memory device 102 mate with matching contacts 110 disposed on the floor of bill validator compartment 108. Contacts 104, 110 are designed so that a wide tolerance is available for inserting currency container into bill validator compartment 108 while still maintaining a reliable electrical connection between the contacts 104 and 110. That is, unlike traditional male/female connector portions, non-specific alignment is provided between contacts 104 and 110.

In alternate embodiments, non-contact interconnection of memory device 102 with external circuitry (not shown) could be used. Radio frequency (RF), infrared (IR), inductive, or other interconnection techniques such as are well known to those skilled in the art could be used to provide a non-physical connection. These techniques could be particularly useful if memory device 102 were moved from the bottom of currency container 100 to an alternate location.

Referring now also to FIG. 4, there is shown a simplified schematic block diagram showing the interconnection of memory device 102 to electrical circuitry within a gaming machine (not shown). An electronic circuit board 112 containing the necessary circuitry to read from and write to memory device 102 is housed within the gaming machine, typically within bill validator compartment 108. This circuit board is called the ID and Data Unit (ID/DU) 112 in the embodiment chosen for purposes of disclosure. ID/DU 112 is connected to memory device 102 by cable 114 through contacts 104 and 110. Currency acceptor 106 generally has an electrical interface 116 which provides various signals to both control and data circuits (not shown) within the gaming machine. These existing circuits may vary from gaming machine to gaming machine and form no part of the present invention. Although in the embodiment chosen for purposes of disclosure ID/DU 112 is designed for self contained, stand-alone operation, it may, optionally, be connected to interface 116 of currency acceptor 106 through cable 118 shown in phantom to signify its optional nature. It should be noted that this optional connection represents a generic, non-specific connection to interface 116 and represents any and all necessary interconnections between ID/DU 112 and any circuitry within currency acceptor 106 or other gaming machine circuitry (not shown). Methods for connecting additional circuitry to internal circuitry within a bill validator 106 or a gaming machine itself are well known to those skilled in the art.

Figure 5:
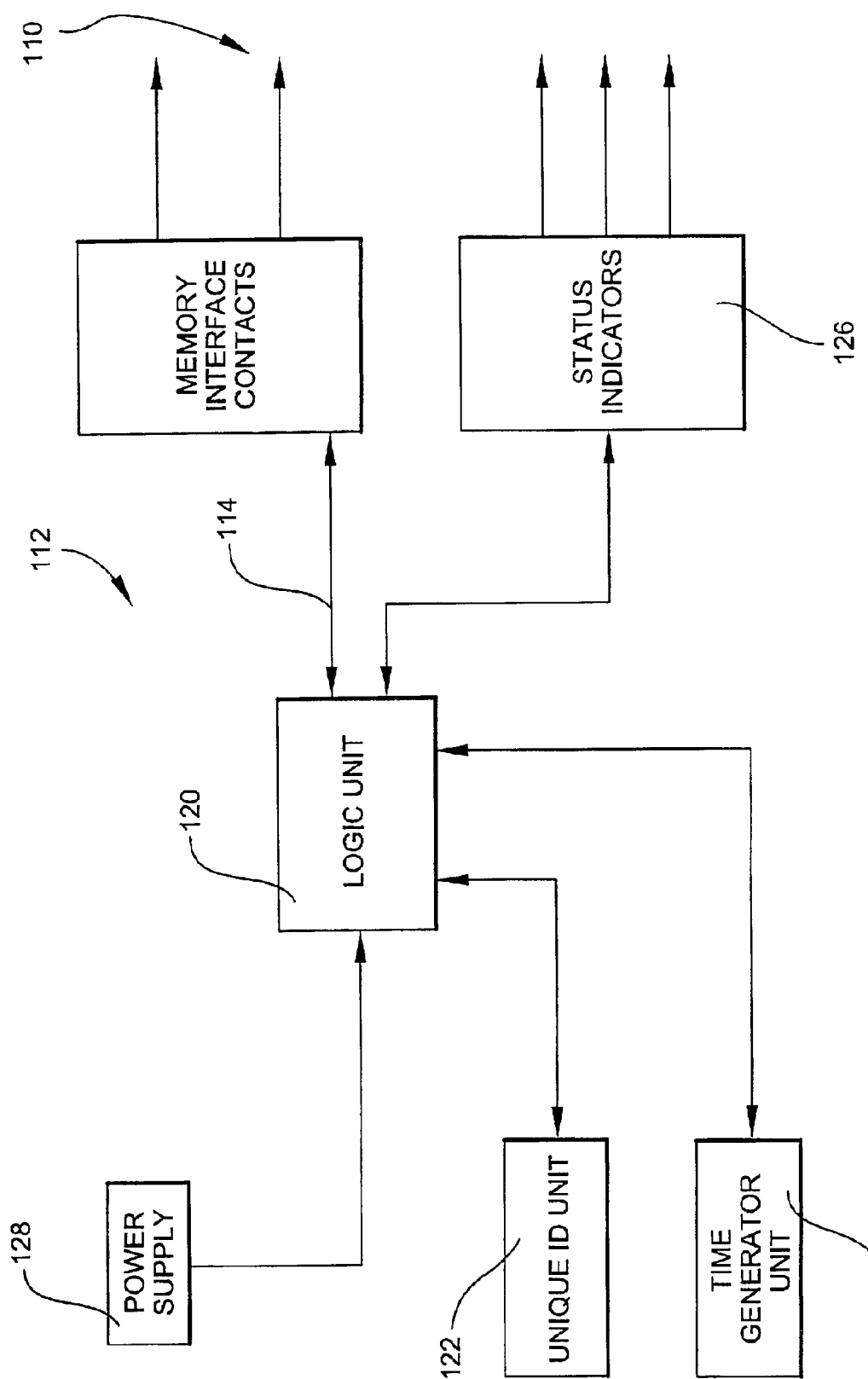
FIG. 5 is a block diagram of the ID/Data Unit forming part of the invention.

Referring now to FIG. 5, there is shown a schematic block diagram of a typical ID/DU unit 112. A logic unit 120 is connected to contacts 110 via connection 114. Contacts 110 are adapted to make electrical connection with contacts 104 (FIG. 4) of memory device 102. Logic unit 120 may be a microprocessor, a microcontroller, or other similar circuitry and is assumed to included all ancillary circuitry (e.g., memory, etc.) necessary to function as a logic unit. The design, construction, programming, interconnection and operation of such logic units are well known to those skilled in the art. A unique ID unit 122 is connected to an input/output (I/O) port of logic unit 120. ID unit 122 contains a unique identifying code such as a machine number, etc. associated with the gaming machine into which ID/DU 112 has been installed. ID unit 122 could contain any type of PROM or similar programmable device within which the unique code may be stored. In the embodiment chosen for purposes of disclosure, it is assumed that ID unit 122 has been programmed externally to ID/DU 112. In alternate embodiments, a programming interface (not shown) could be provided so that ID unit 122 could be programmed within ID/DU 112. Also connected to an I/O port of logic unit 120 is a time generator unit 124, typically a real time clock (RTC). Status indicators 126 are also connected to an I/O port of logic unit 120. While status indicators 126 are typically LED indicators, it should be obvious that other type of indicators or displays could also be used. Power for operation of logic unit 120 is provided by power supply 128. Power supply 128 represents any source of available power for the operation of logic unit 120. It should be obvious that the necessary operating power for ID/DU 112 could be provided by existing power supplies within the gaming machine as well as from dedicated power supplies or other power sources.

Figure 6:
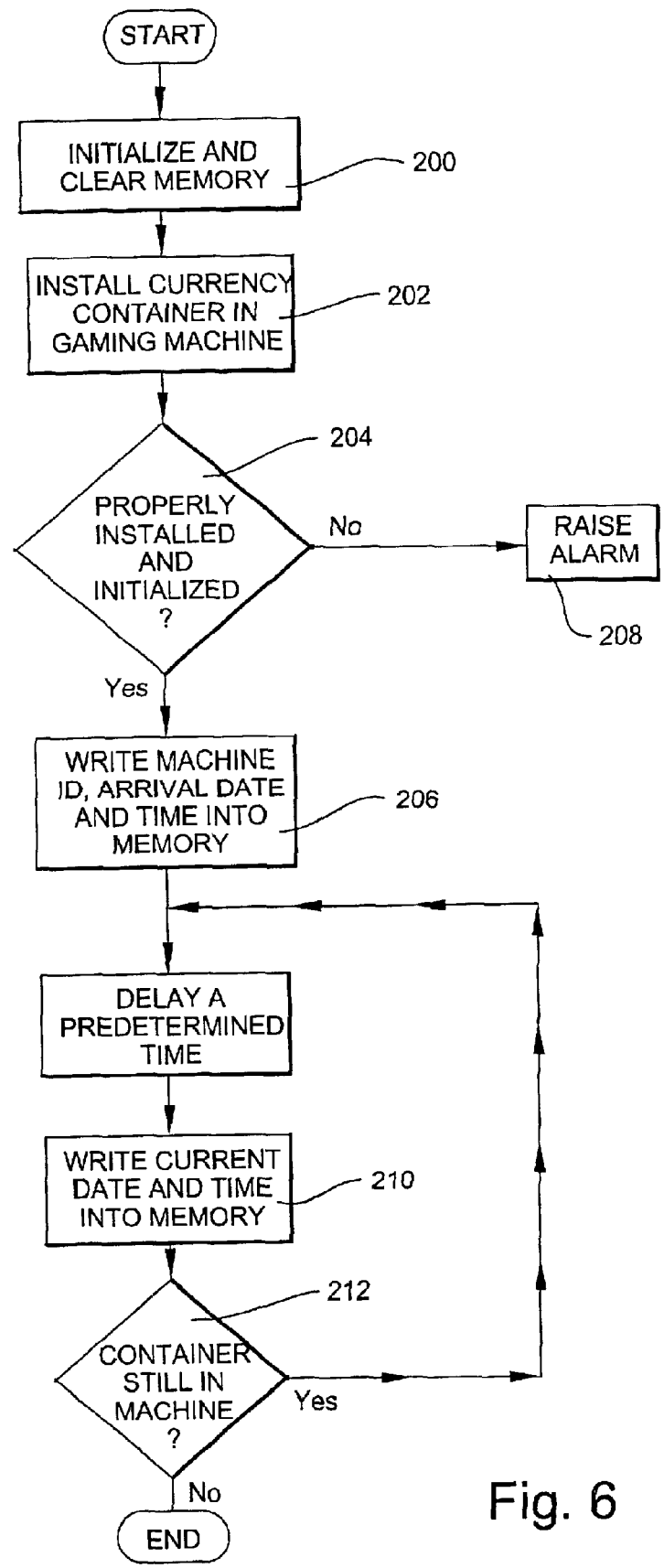
FIG. 6 is flow chart of the steps performed when the currency container of FIG. 1 is initially installed in a gaming machine.

Referring now to FIG. 6, there is shown a simplified flow chart describing the steps for installing and using currency container 100 in a gaming machine. In operation, currency container 100 is initialized, step 200, using apparatus and procedures to be described in detail hereinbelow. At a minimum, the initialization operation erases all previous temporary data stored in memory device 102. The currency container ID is considered permanent data and remains constant throughout the service life of the currency container 100. After currency container 100 has been initialized, it may be installed in any compatible gaming machine, step 202, in a manner well known to service personnel in gaming casinos. Once contacts 104 and 110 have been properly mated during the insertion process (i.e., currency container 100 is securely in place within bill acceptor compartment 108), communication is initiated by ID/DU 112 and memory device 102 is interrogated, step 204. ID/DU 112 checks to ensure that all previous temporary data has been erased and that the memory device 102 has been properly initialized. Assuming that memory device 102 has been properly initialized, ID/DU 112 writes the identification code for the gaming machine (not shown) into which currency container 100 has just been inserted, step 206. This gaming machine ID information may either be stored within ID/DU 112 or may be obtained from the gaming machine itself. In addition, the current date and time (i.e., the date and time of arrival in the gaming machine) is also written into memory device 102, step 206.

If, however, there is existing data in memory device 102, a bad cyclic redundancy check (CRC) value is detected, or some other problem such as improper insertion, etc. is detected, an alarm is provided to alert service personnel of the problem, step 208. Typically, visual status indicators 126 (FIG. 5) are provided on ID/DU 112 showing at least the good/bad status of memory device 102 or the data stored therein. These indicators 126 (FIG. 5) could also be provided external to the gaming machine to facilitate quick response to a problem with the machine. In alternate embodiments, a local audible alarm (not shown) could be sounded. In still other embodiments, a error message could be sent to a central monitoring area (not shown) over a network (not shown) interconnecting a number of gaming machines (not shown). However, because checking step 204 is performed substantially simultaneously with the insertion of currency container 100, indicators 126 within the machine near currency container 100 are generally sufficient because the service person will not yet have closed the machine cover when the error is detected.

Currency container 100 remains in the gaming machine until either it is full or it is removed as part of a periodic removal process. During the period that currency container 100 is installed, the current date and time are periodically written into memory device 102, step 210. This process continues until currency container 100 is removed from the gaming machine, step 212. The last date and time written into memory device 102, step 210, will, effectively, be the date and time at which currency container 100 was removed from the gaming machine.

It will be obvious to those skilled in the art that other parameters could be written into memory device 102 as well. For example, the bill count and a calculated total amount of money in currency container 100 could both be stored in memory device 102. Many other types of data could be stored in memory device 102 as required for a specific operating environment or circumstance.

Figure 7A:
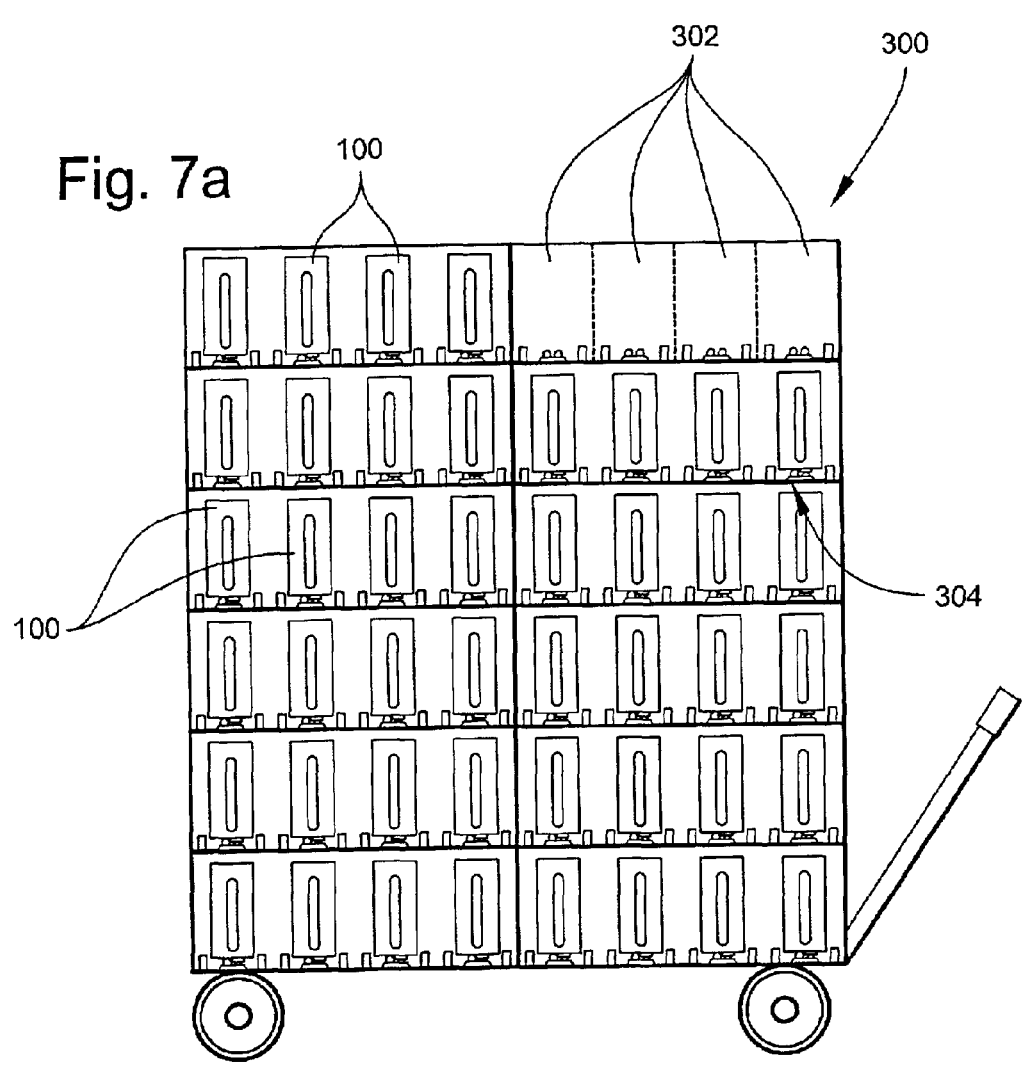
FIG. 7a is a side elevational view of a mobile unit designed to receive the currency containers as shown in FIG. 1.
Figure 7B:
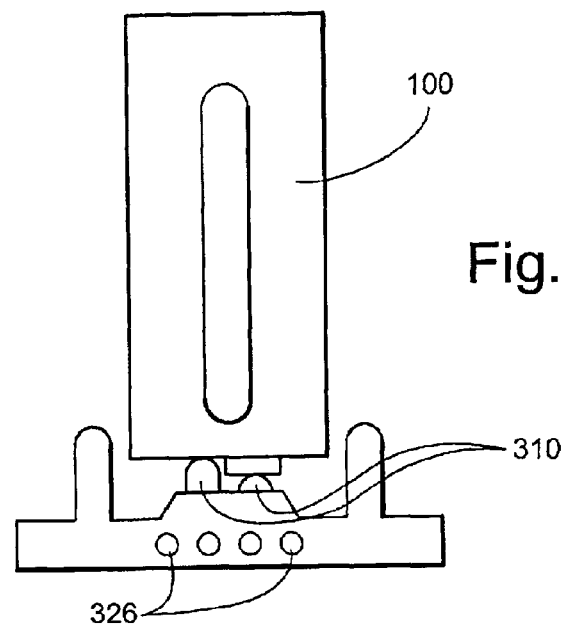

Referring now to FIGS. 7a and 7b, there are shown a mobile cart (FIG. 7a), generally at reference 300, and a detailed view (FIG. 7b) of a portion of the mobile cart of FIG. 7a. Mobile cart 300 could be either self-propelled or adapted to be towed behind a tractor or similar vehicle. The use of mobile collection carts in casinos or the like is well known and any suitable cart could be modified to provide the functions present in the cart of the instant invention. Cart 300 has a number of slots 302 adapted to receive currency containers 100. In the embodiment chosen for purposes of disclosure, cart 300 is anticipated to have 250 or more slots 302. In alternate embodiments, as few as 10 or as many as 1000 containers could be housed in cart 300. Locking mechanisms (not shown) could be provided to individually physically secure each currency container 100 into a slot 302 in mobile cart 300. Such locking mechanisms are well known to those skilled in the art. Each slot 302 is provided with data contacts 310, whereby each currency container 100 is electrically connected to an on-board controller, typically Validation and Tracking Unit (VTU) 360 (FIG. 10) on mobile cart 300. Mobile cart 300 is free to traverse the floor of a casino or similar area so that currency containers 100 may be systematically removed from successive gaming machines and loaded into slots 302 of cart 300.

Once a currency container 100 is removed from a gaming machine and inserted into an empty slot 302 on mobile cart 300, communications is established with memory device 102 on each currency container 100 through contacts 104 and 310. The memory device 102 of each currency container 100 being loaded into a slot 302 of mobile cart 300 is immediately interrogated to insure that the container 100 meets the criteria for being a valid container. Such information as the container's ID number, the validity of the date/time window during which currency container 100 reports being in a gaming machine, a valid CRC number, as well as other checks of the data integrity and container validity. Indicators 126 near each currency container 100 provide status information about the container and the validity of the data within the container's memory device.

Figure 8:
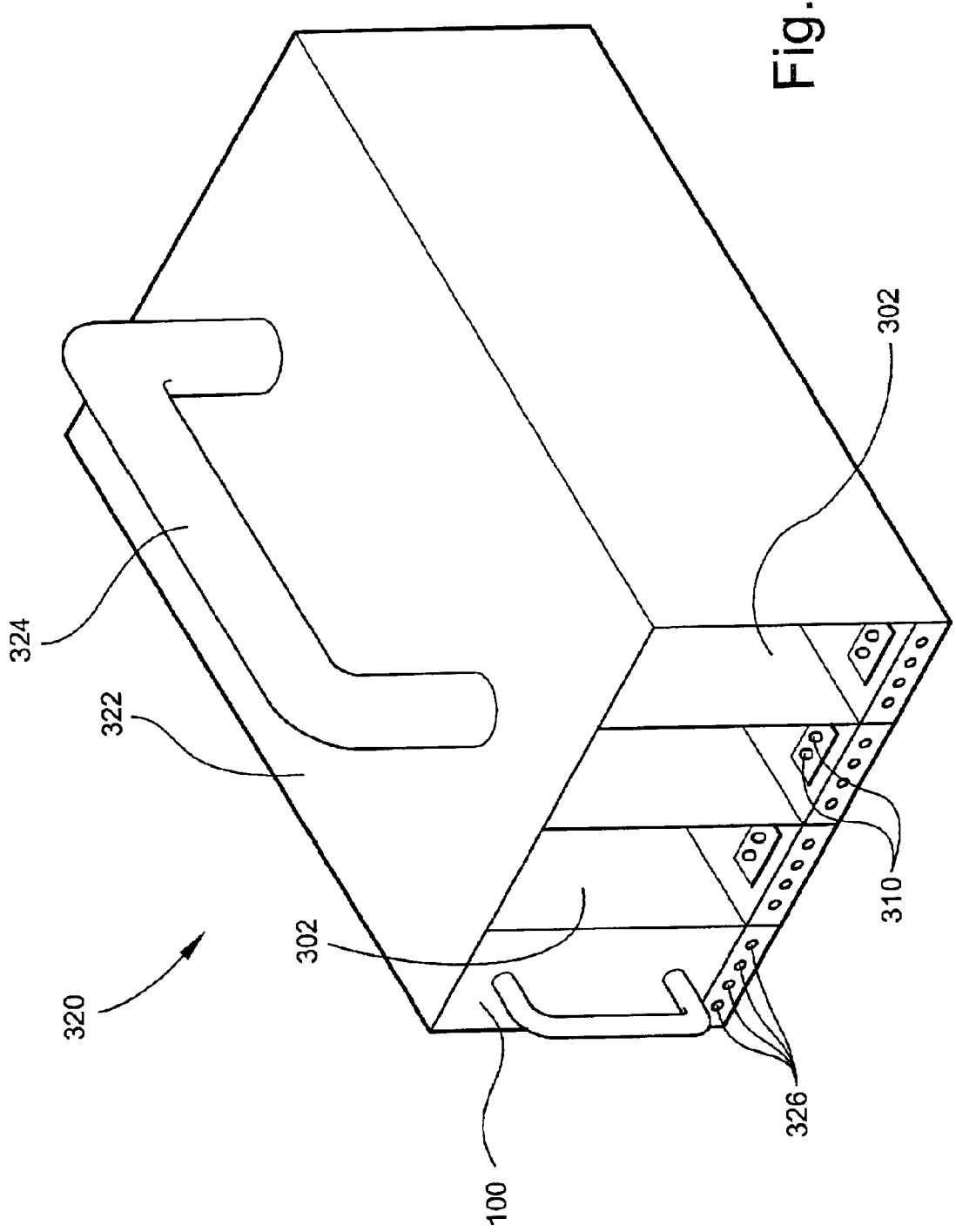
FIG. 8 is a perspective view of a hand-carried currency container transporting and monitoring unit.

In a typical casino, gaming parlor, or similar establishment, gaming machines are emptied periodically and systematically. A schedule is established that optimizes, to the greatest extent possible, the availability of the machine(s) to the patrons thereof. There are circumstances, however, when one or more individual machines out of hundreds or even thousands of machines on the floor requires non-scheduled emptying. These "emergencies" are handled on an individual basis using the portable container collection unit 320 shown in FIG. 8. Collection unit 320 has a housing 322 and is equipped with a handle 324 to provide ease of movement. One or more container receiving slots 302, essentially identical to slots 302 of mobile unit 300 (FIG. 7*a*). Each collection unit 320 may have as few as one slot 302, or as many as four as shown in the embodiment chosen for purposes of disclosure. It should be obvious that varying numbers of slots 302 could be provided to meet a particular operating circumstance or environmental need, although four slots 302 provide a collection unit 320 which may still be readily carried by a service person, even when all fours slots 302 are occupied by currency containers 100. Contacts 310 are provided to electrically interconnect with contacts 104 (FIG. 1) of currency container 100. Indicators 326 provide identical functions as do indicators 326 on mobile unit 300. In summary, there is little functional difference in operation between mobile unit 300 with, perhaps, 250 slots 302 and collection unit 320 with four slots 302, other than the different number of currency containers 100 which may be accommodated within each different type unit.

Because most cash is collected from gaming machines during the aforementioned regular collection times, the casino's vault may be accessible only during these specific, predetermined times. This means that currency containers 100 collected at random times (relative to the normal collection schedule) may need to be securely stored until the next counting time period.

Figure 9:
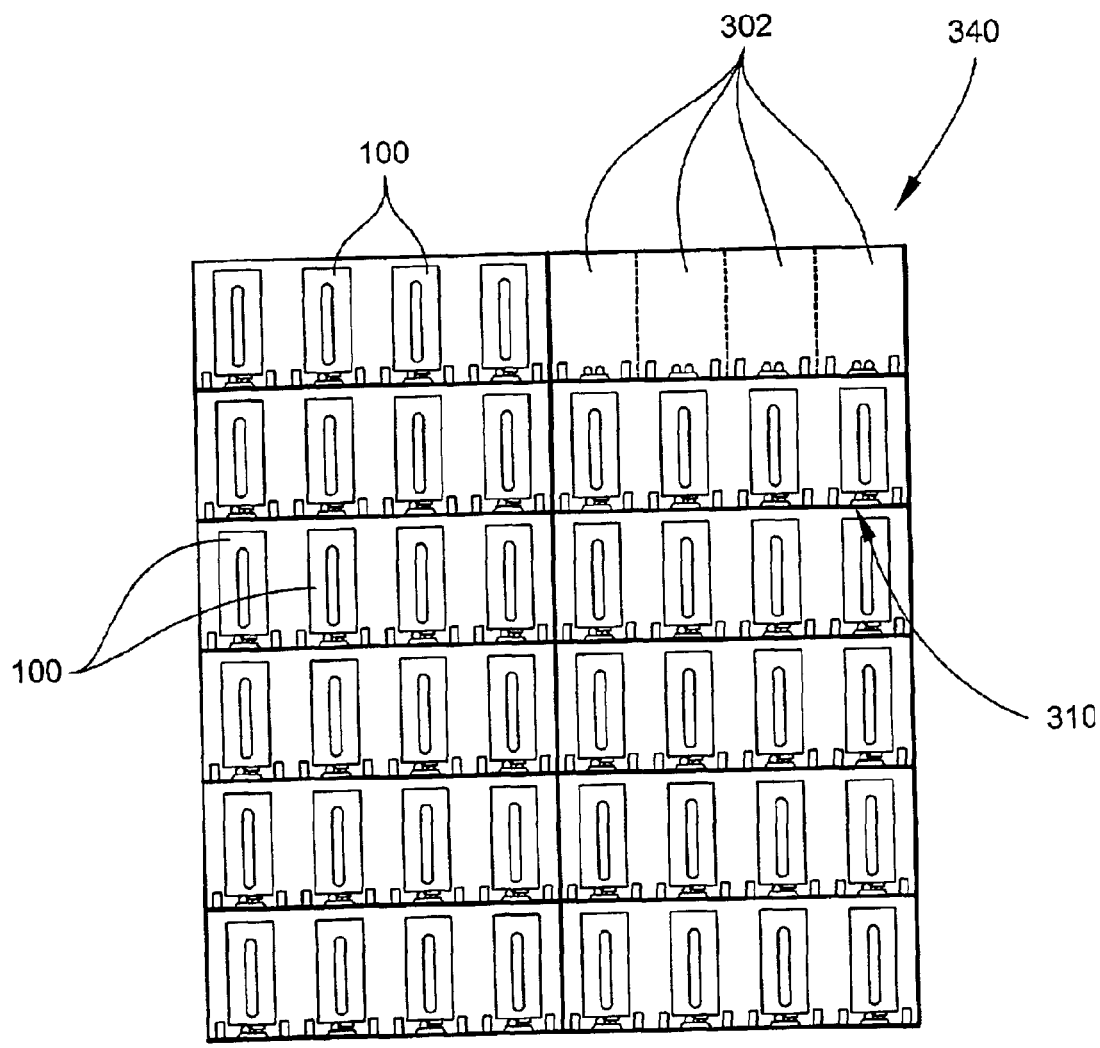
FIG. 9 is a front elevational schematic view of a temporary storage unit.

To accomplish this, a temporary storage unit 340 is shown in FIG. 9. Temporary storage unit 340 is similar in design to mobile unit 300 (FIG. 7*a*) except it is designed to be semi-permanently installed in the casino's secure counting room or a similar location. Complete monitoring of currency containers 100 is performed by temporary storage unit 340 in a manner essentially identical to portable collection unit 320 (FIG. 8) and mobile unit 300 (FIG. 7*a*)

Figure 10:
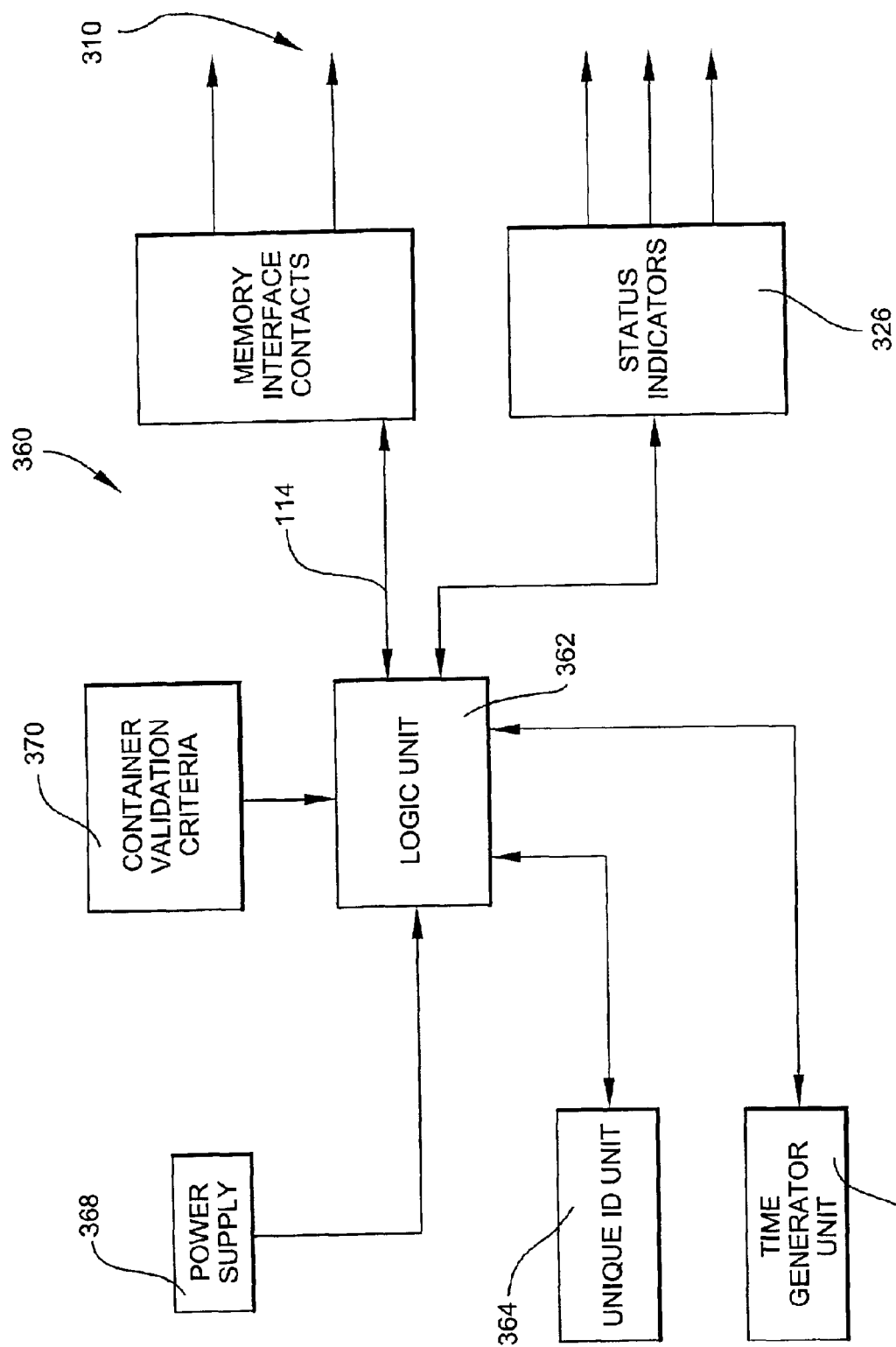
FIG. 10 is a schematic block diagram of a Validation and Tracking Unit (VTU) for use in the mobile cart of FIG. 7a, the hand-carried monitoring unit of FIG. 8 and the temporary storage unit of FIG. 9.

In operation, mobile unit 300, portable collection unit 320 and temporary storage unit 340 perform essentially identically. In the following discussion, the term monitoring unit will be used to apply to any of the three devices. When a currency container 100 is first inserted into an open slot 302 of the monitoring unit, electrical contact is made between contacts 104 of currency container 100 and contacts 310 of the monitoring unit. Communication is established between the validation and tracking unit (VTU) 360 as shown in FIG. 10. This circuitry, represented in schematic block diagrammatic form, is generally similar to the circuitry of FIG. 5.

Referring now to FIG. 10, there is shown a schematic block diagram of a typical VTU 360. A logic unit 362 is connected to contacts 310 which are adapted to make electrical connection with contacts 104 (FIG. 4) of memory device 102. Logic unit 362 may be a microprocessor, a micro-controller, or other similar circuitry and is assumed to included all ancillary circuitry (e.g., memory, etc.) necessary to function as a logic unit. The design, construction, programming, interconnection and operation of such logic units are well known to those skilled in the art. A unique ID unit 364 is connected to an input/output (I/O) port of logic unit 362. ID unit 364 contains a unique identifying code for the monitoring unit. This unique code may identify the entire monitoring unit or, in alternate embodiments, each slot 302 of the monitoring unit may be uniquely identified. ID unit 364 could contain any type of PROM or similar programmable device within which the unique code may be stored. In the embodiment chosen for purposes of disclosure, it is assumed that ID unit 364 has been programmed externally to VTU 360. In alternate embodiments, a programming interface (not shown) could be provided so that ID unit 364 could be programmed within VTU 360. Also connected to an I/O port of logic unit 362 is a time generator unit 366, typically a real time clock (RTC). Status indicators 326 are also connected to an I/O port of logic unit 360. Power for operation of logic unit 360 is provided by power supply 368. Power supply 368 represents any source of available power for the operation of logic unit 360. Power supply 368 will typically consist of rechargeable batteries (not shown) for use in mobile unit 300 and portable container collection unit 320. Temporary storage unit 340 generally would use a conventional power supply connected an AC line.

Because one important function of the monitoring units 300, 320, 340 is validation of a currency container 100, validation criteria is stored in a validation criteria memory device 370 connected to logic unit 362. The information stored within memory device 370 includes a database containing a list of every valid currency container 100 ID currently defined within the casino. A casino or similar establishment may be subdivided into separate regions or venues, and the databases could be different in different venues. This prevents a currency container 100 from one venue from being inserted into a slot 302 of a validating unit assigned to a different venue without immediate detection.

Figure 11:
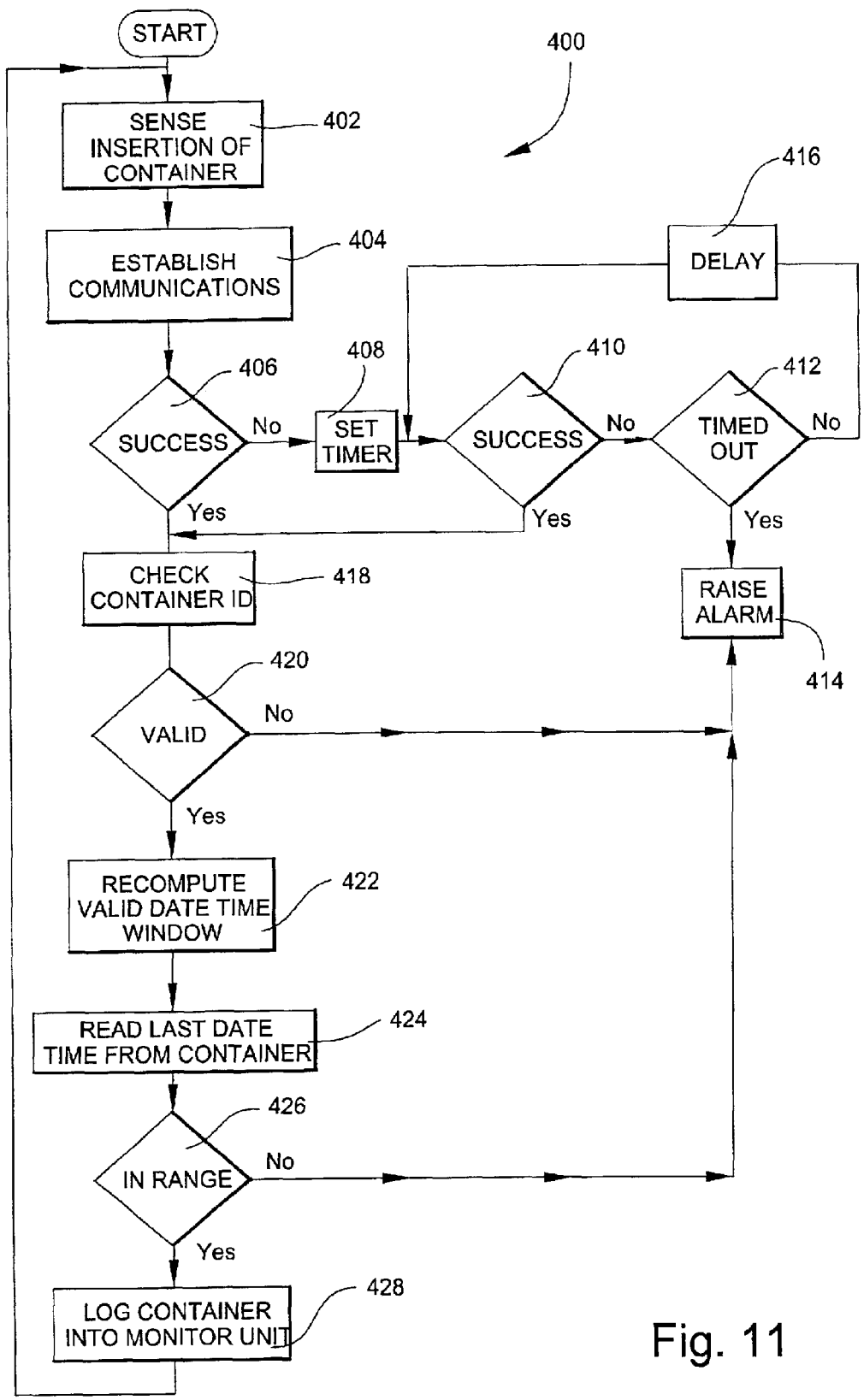
FIG. 11 is a flow chart showing the step of validating and monitoring a currency container.

Referring now to FIG. 11, there is shown a flowchart of a typical data validation procedure, generally at reference number 400. Control unit 360 (FIG. 10) monitors multiple sets of contacts 310, generally using a multiplexor as is well known to those skilled in the art, for the presence of a currency container 100 being inserted into an empty slot 302, step 402. When the presence of a currency container 100 is sensed, controller 360 attempts to establish communications with the newly-added currency container 100, step 404. If communications are unsuccessful, step 406, a timer is set, step 408 for a predetermined timeout. During the predetermined time, communication success will periodically be rechecked, step 410. If communication has still not been established, step 410, the timer is checked, step 412 to see if the predetermined time has been exceeded. If the time is up (i.e, the predetermined time has been exceeded), an alarm is raised, step 414. Otherwise, control unit 360 waits a short, predetermined time, step 416, and control is passed back to block 410.

If, however, communication is successfully established, step 406 or 410, control is passed to block 418 where the currency container's 100 ID data is read from its memory device 102. If an invalid currency container 100 ID is detected, step 420, an alarm is raised, step 414. If however, a valid currency container 100 is detected, a valid date/time window is computed using information from time generator unit 366 (FIG. 10), step 422. Date and time information is read from the memory device 102 of currency container 100, step 424. If the date/time information for the currency container 100 is not within the computed window, step 426, an alarm is raised, step 414. If, however, the date/time information is within the computed window, the currency container 100 is logged in, and the ID of the monitoring unit, the current date and time, as well as any other required data is written into memory device 102 of currency container 100, step 428. Control is again passed to step 402 where the insertion of another currency container 100 is awaited.

Figures 12A, 12B:
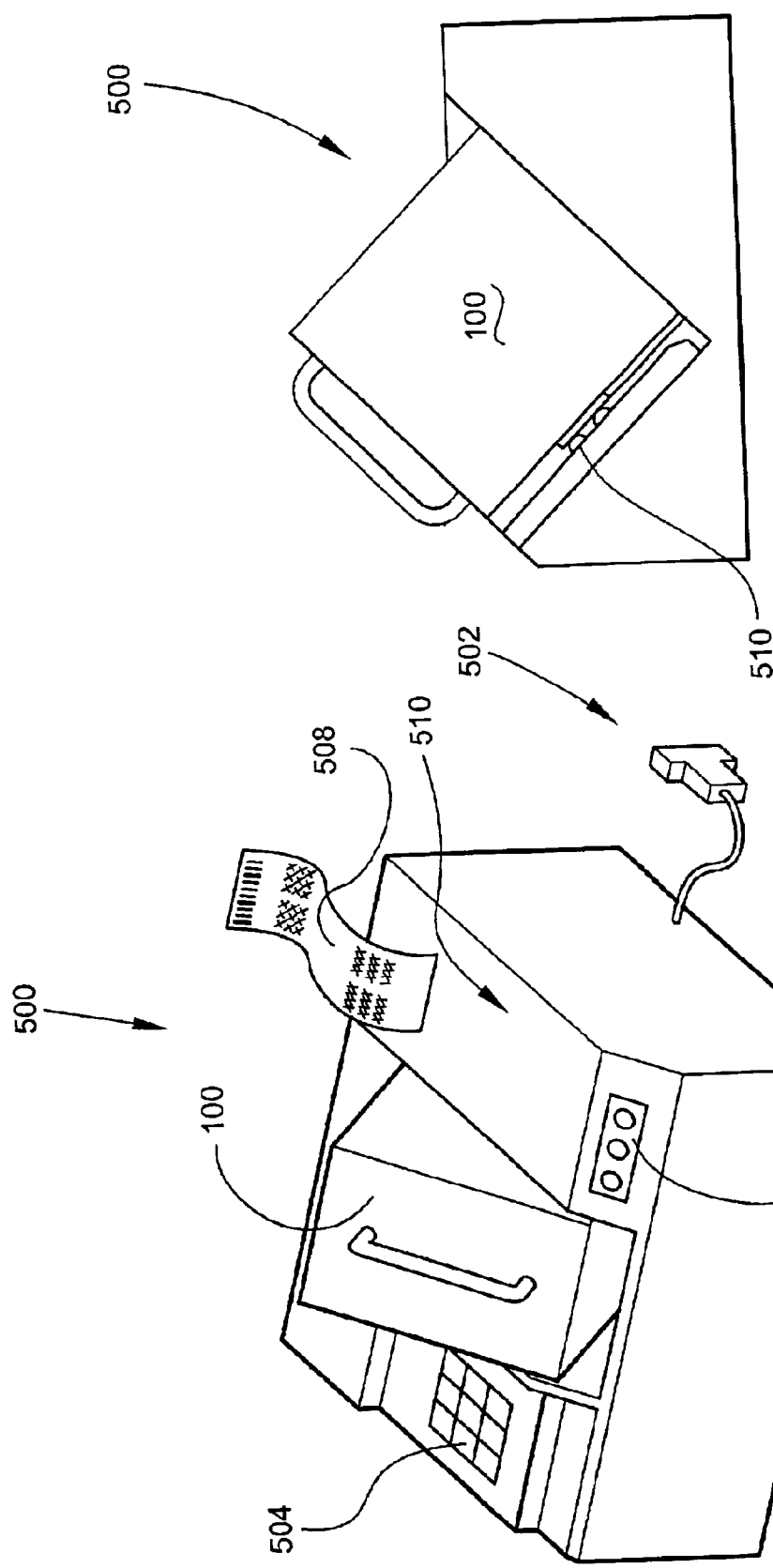

Referring now to FIGS. 12a and 12b, there are shown perspective and side, cross-sectional views, respectively, of a docking station, generally at reference number 500. Docking station 500 is the final type of apparatus adapted for use with currency container 100 and is typically located in a secure counting room or similar location. Each currency container 100, after being electronically "released" from a monitoring unit, is placed into docking station 500. As best seen in FIG. 12b, mating contacts 510 are provided for electrical interconnection with contacts 104 on memory device 102. As is the case when a currency container 100 is placed into any monitoring unit, its validity is ascertained in a manner similar to that described hereinabove. Docking station 500 is equipped with an interface, symbolized by connector 502, for connecting to a digital computer (not shown). All information stored in memory device 102 associated with the currency container 100 is typically downloaded and stored in a computer database (not shown) for later retrieval and possible analysis. If a data error is encountered, an operator may be able to repair the data using the keypad 504 located on docking station 500. While LED indicators have been shown for purposes of disclosure, it will be obvious that alternate forms of indicators or displays could also be used. If, however, the data error is unrepairable, the operator is notified by indicators or display 506 on docking station 500. It should be obvious that in alternate embodiments that docking station 500 could be equipped with a textual or graphic display using a CRT, LCD or similar display device. These devices could give specific directions to an operator as to how a particular currency container 100 should be handled.

Once the validity of the data in memory device 502 is established, a bar coded printout 508 is made by built-in printer 510. Printout 508 containing the complete history (i.e., the audit trail) of currency container 100 during its valid life cycle. Printout 508 is united with and typically accompanies the contents of currency container 100 for further processing in the casino counting room.

Finally, after all data in memory device 102 has been verified, sent to the computer database, and printed onto printout 508, all non-permanent data stored in memory device 102 is erased, thereby ending the valid life cycle of currency container 100. Typically, the only data remaining in memory device 102 will be the currency container ID. Currency container 100 is now out of service and is ready for installation in a gaming machine as required. Such an insertion into a gaming machine then begins a new valid life cycle for currency container 100.

It is to be understood that the present invention is not limited to the embodiments described above, but encompasses any and all embodiments within the scope of the following claims.

What is claimed is:

1. A system for tracking currency containers in a gaming casino, comprising:

a) a currency container adapted for removable insertion in a gaming machine and adapted to receive currency therefrom, said currency container comprising a memory device having means for electrically communicating with said gaming machine, whereby data may be stored in said memory device by said gaming machine;

b) receiving means adapted to engagebly receive and secure said currency container once removed from said gaming machine, said receiving means being adapted for electrical communication with said memory device and also adapted to read and verify at least a portion of said data stored in said memory device; and c) monitoring means operatively connected to said receiving means for substantially continuously monitoring the presence of said currency container within said receiving means and substantially continuously monitoring the validity of at least a portion of said data.

2. The system for tracking currency containers as recited in claim 1, wherein said means for electrically communicating between said gaming machine and said memory device comprises an electrical contact.

3. The system for tracking currency containers as recited in claim 1, wherein said means for electrically communicating between said gaming machine and said memory device comprises a contactless interconnection therebetween.

4. The system for tracking currency containers as recited in claim 3, wherein said contactless interconnection comprises at least one method from the group: infrared link, radio frequency link and inductively coupled link.

5. The system for tracking currency containers as recited in claim 1, wherein said gaming machine comprises an ID/Data Unit adapted for communicative interaction with said currency container for reading data from and writing data to said currency container.

6. The system for tracking currency containers as recited in claim 1, wherein said memory device comprises a non-volatile memory device.

7. The system for tracking currency containers as recited in claim 6, wherein said memory device comprises a non-volatile memory device from the group: EPROM and flash memory device.

8. The system for tracking currency containers as recited in claim 5, wherein said data written by said ID/Data Unit into said memory device comprises data representative of at least a gaming machine ID, a date and a time.

9. The system for tracking currency containers as recited in claim 1, further comprising: d) indicator means proximate and operatively connected to said receiving means and responsive thereto for indicating a result of said verification of at least a portion of said stored data.

10. The system for tracking currency containers as recited in claim 9, wherein said receiving means comprises at least one from the group: mobile unit adapted to receive a plurality of said currency containers; a portable, hand-carried receiving unit adapted to receive at least one of said currency containers; and a fixed, temporary storage unit adapted to receive a plurality of said currency containers.

11. The system for tracking currency containers as recited in claim 10, wherein said mobile unit comprises a wheeled cart configured to receive a plurality of said currency containers.

12. The system for tracking currency containers as recited in claim 11, wherein said plurality of said currency containers comprises a quantity of said currency containers range of approximately 10 to 1000.

13. The system for tracking currency containers as recited in claim 10, wherein said portable, hand-carried receiving unit is configured to receive in the range of approximately one to four currency containers.

14. The system for tracking currency containers as recited in claim 1, further comprising: d) a docking station for receiving said currency container and adapted for electrical communication with said memory device to read and verify at least a portion of said data stored in said memory device, said docking station comprising a computer interface for facilitating communicative connection to a computer.

15. The system for tracking currency containers as recited in claim 14, wherein said docking station comprises:
  i) a keyboard adapted for entering data;
  ii) indicators for displaying status information regarding said data in said memory device; and
  iii) a printer adapted for printing at least a portion of said data from said memory device.

16. The system for tracking currency containers as recited in claim 14, wherein said docking station is adapted to selectively erase portions of said data in said memory device.

17. The system for tracking currency containers as recited in claim 15, wherein said printer comprises bar code printing means.

18. The system for tracking currency containers as recited in claim 8, wherein said data comprises a cyclic redundancy check (CRC) number and wherein said receiving means further comprises means to verify said CRC number.

19. A system for securely receiving, tracking and transporting currency from a currency-operated machine, comprising:
  a) a currency container adapted to receive and store currency from a currency operated machine, said currency container comprising a non-volatile memory device;
  b) at least one currency operated machine adapted to removably receive said currency container, said machine comprising first interface means adapted to communicate with said non-volatile memory device and selectively read data from and write data to said non-volatile memory device;
  c) a transport apparatus adapted to removably and engagebly receive and secure a currency container and comprising second interface means adapted to communicate with said non-volatile memory device of said currency container and selectively read data from and write data to said non-volatile memory device; and
  d) a docking station for removably receiving said currency container, said docking station means comprising third interface means adapted to communicate with said non-volatile memory device and selectively read data from and write data to said non-volatile memory device.

20. The system for securely receiving, tracking and transporting currency from a currency-operated machine as recited in claim 19, wherein said data includes at least one of the data items: a unique ID of said currency container, a unique ID of said currency operated machine, a unique ID of said transport apparatus, a unique ID of said docking station, a date, and a time.

21. The system for securely receiving, tracking and transporting currency from a currency-operated machine as recited in claim 20, wherein at least one of said currency accepting machine, said mobile transport apparatus and said docking station is adapted to verify at least one of said data items.

22. The system for securely receiving, tracking and transporting currency from a currency-operated machine as recited in claim 21, wherein said data comprises a cyclic redundancy check (CRC) value and wherein said verification of said data comprises checking said CRC value.

23. The system for securely receiving, tracking and transporting currency from a currency-operated machine as recited in claim 19, wherein said docking station further comprises at least one of the devices: a keyboard adapted for entering data, display means for displaying status information regarding said data in said memory device, and a printer adapted for printing at least a portion of said data from said memory device, and a computer interface adapted for communicatively connecting said docking station to an external computer.

24. The system for securely receiving, tracking and transporting currency from a currency-operated machine as recited in claim 23, wherein said display means comprises at least one from the group: at least one LED, CRT display, LCD display, other text display, and other graphic display.

25. The system for securely receiving, tracking and transporting currency from a currency-operated machine as recited in claim 23, wherein said docking station is adapted to selectively erase portions of said data in said memory device thereby initializing said currency container.

26. The system for securely receiving, tracking and transporting currency from a currency-operated machine as recited in claim 23, wherein said printer is adapted to print at least a portion of said data in said non-volatile memory device.

27. The system for securely receiving, tracking and transporting currency from a currency-operated machine as recited in claim 26, wherein said printer is further adapted to print a bar code representative of a at least a portion of said data in said non-volatile memory device.

28. A method for utilizing a currency container in a currency container tracking system, the steps comprising:
  a) providing an initialized currency container adapted for receiving currency from a currency receiving machine, said currency container comprising a nonvolatile memory device adapted to electronically store data therein;
  b) providing at least one currency receiving machine adapted for engagebly receiving and securing currency from a user thereof and depositing said currency into said currency container, said currency receiving machine being adapted to communicate with said non-volatile memory device of said currency container thereby facilitating reading data from and writing data to said non-volatile memory device;

c) initiating a valid life cycle by inserting said initialized currency container into said currency receiving machine and writing data representative of at least one of: a unique ID of said currency receiving machine, a date, and a time into said nonvolatile memory device;

d) receiving currency from said currency receiving machine and depositing said currency in said currency container;

e) periodically writing data representative of at least one of: a unique ID of said currency receiving machine, a date, and a time into said non-volatile memory device;

f) removing said currency container from said currency receiving machine and inserting said currency container into a receiving apparatus;

g) substantially continuously monitoring the presence of said currency container within said receiving apparatus and substantially continuously monitoring the validity of at least a portion of said data via monitoring means operatively connected to said receiving apparatus;

(h) transporting said currency container in said receiving apparatus to a secure space;

i) removing said currency container from said receiving apparatus and inserting said currency container into a docking station;

j) verifying at least a portion of said data in said memory device;

k) printing at least a portion of said data along with a bar code representative of at least a portion of said data thereby creating a printed document; and l) removing said currency from said currency container and uniting said printed document with said removed currency.

29. The method for utilizing a currency container in a currency container tracking system as recited in claim 28, the steps further comprising: after said verifying step (j), transmitting at least a portion of said data in said memory device to a remote computer.

30. The method for utilizing a currency container in a currency container tracking system as recited in claim 28, wherein said removing and inserting step (f) comprises the sub-step: upon insertion of said currency container in said receiving apparatus, verifying at least a portion of the data in said non-volatile memory device and, while said currency container remains in said receiving apparatus, monitoring at least a portion of said data.

31. The method for utilizing a currency container in a currency container tracking system as recited in claim 28, the steps further comprising: after removing said currency container from said currency receiving machine temporarily storing said currency container in a temporary storage apparatus.

32. The method for utilizing a currency container in a currency container tracking system as recited in claim 28, wherein said receiving apparatus comprises at least one from the group: mobile unit adapted to receive a plurality of said currency containers and portable, hand-carried receiving unit adapted to receive at least one of said currency containers.

33. The method for utilizing a currency container in a currency container tracking system as recited in claim 28, the steps further comprising: after said removing step (m), reinitializing said currency container by erasing all non-permanent data from said memory device.

* * * * *

UNITED STATES PATENT AND TRADEMARK OFFICE
CERTIFICATE OF CORRECTION

PATENT NO. : 6,845,905 B2  Page 1 of 1
APPLICATION NO. : 09/956787
DATED : January 25, 2005
INVENTOR(S) : Steven J. Blad It is certified that error appears in the above-identified patent and that said Letters Patent is hereby corrected as shown below:

On Title Page, Item (63), please delete ", which is a continuation-in-part of application Ser. No. 08/675,899, filed Jul. 5, 1996, now abandoned".

Signed and Sealed this

Thirtieth Day of September, 2008

JON W. DUDAS
*Director of the United States Patent and Trademark Office*